Aug. 23, 1949.   A. T. EWELL   2,480,005
WIRE ROPE
Filed Dec. 19, 1945

INVENTOR.
Andrew Travers Ewell,
BY
ATTYS.

UNITED STATES PATENT OFFICE 2,480,005

WIRE ROPE

Andrew Travers Ewell, Atlanta, Ga., assignor to Don P. Gavan, Atlanta, Ga.

Application December 19, 1945, Serial No. 635,863

9 Claims. (Cl. 57—147)

This invention relates to wire rope and more particularly has reference to wire rope, having a core of elastic material.

Rope made of strands of metal such as steel and iron, have been widely used for a number of purposes in the transmission of power such as the hauling and raising of loads and as stays and the like.

In such operations, especially in the hauling or raising of loads, the rope is subjected to severe shock stresses and, therefore, should have a substantial modulus of elasticity. In the driving of drums or sheaves elasticity is essential to compensate for initial stretch occurring during the first use of the rope and to enable the rope to conform closely to the shape of the pulley sheaves so as to increase the coefficient of friction between these moving parts and reduce wear. Such use subjects the rope to a bending stress which is sufficiently severe to limit the diameter of the pulley which can be used without undue wear.

Hitherto, power transmission ropes have not had a sufficient modulus of elasticity to absorb properly the shock and bending stresses and stretch occasioned by industrial use. This failure has resulted in the trial of the number of rope structures to compensate for this weakness without complete success.

One of the objects of the present invention is to overcome the above mentioned disadvantages of the prior art.

Another object of the present invention is to provide a rope constructed of metallic strands having a core of elastic material.

Still another object of the present invention is to provide a rope of the character described having a substantial modulus of elasticity.

Yet another object of the present invention is to provide a rope of the character described, preferably having a so-called "short lay" providing greater longitudinal elasticity for use as a hawser or mooring line for securing ships at wharves or riding at anchor, which use subjects ordinary wire rope to sudden shocks which are not readily absorbed, but which would be distributed evenly over the entire length of rope of the character described.

A further object of the present invention is to provide a rope of the character described which conforms under tension to a curved surface.

With these and other objects in view which may be incident to my improvements, the invention consists in the combinations to be hereinafter set forth and claimed with the understanding that the necessary elements comprising this invention may be varied in construction, proportions and arrangement, without departing from the spirit and scope of the appended claims.

Broadly, the invention embraces the concept of providing a rope, constructed of metallic strands, having a core of elastic material. The core of elastic material may be solid or hollow, and preferably the strands are formed of twisted wires having hemp centers. The hemp centers should contain a substance for the purpose of lubricating the strands of wire.

This cable structure is highly advantageous because it has a substantial modulus of elasticity and under tension will conform to a curved surface, such as is presented by a V pulley.

Figure 1:
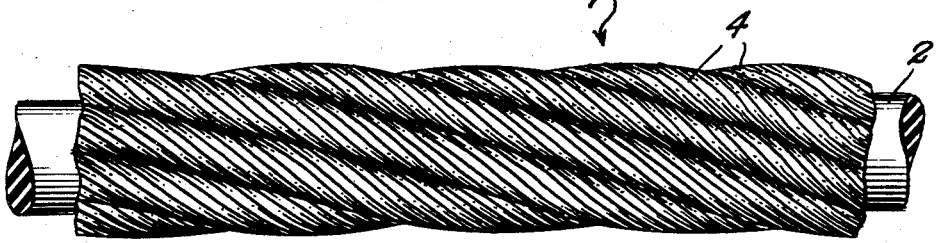
Figure 1 is a side elevational view of a section of wire rope embodying the present invention.
Figure 2:
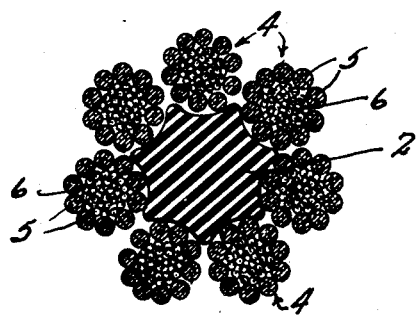
Figure 2 is a cross sectional view of the wire rope shown in Figure 1.
Figure 3:
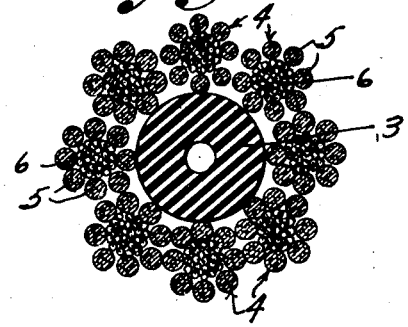
Figure 3 is a cross sectional view of a wire rope embodying the present invention having a hollow center core.

For the purpose of illustrating the invention, there is shown in the drawings a rope, generally indicated by the numeral 1, which is provided with a solid elastic core 2. This core may be made of any suitable elastic material, and preferably natural rubber or a synthetic rubber such as chloroprene rubber, possessing oil-resistant properties. For rope adapted for some purposes, a hollow elastic core 3 should be used in order to promote conformation of the rope with the surface against which it is to be tensioned.

The core is surrounded by a plurality of strands 4. Each of these strands is formed of wires 5 twisted around a center of fibrous material such as hemp 6. These hemp centers should contain a material, such as tallow, for lubricating the strands, which will not deteriorate the elastic core. This will permit the rope to be dipped in a bath of the lubricant should the material stored in the hemp centers become exhausted.

Ropes of this construction are especially suitable for use in hauling and hoisting weights, as a tension member to pass over sheaves and for use as hawsers or mooring lines. As a result of the use of the core of elastic material, the rope has a substantial modulus of elasticity which will absorb shock stresses occasioned by the sudden stops and starts during such operations.

This substantial modulus of elasticity is also a marked advantage because it compensates for initial stretch arising when a rope is first put in service. This elasticity also prevents a reduction in the coefficient of friction between the pulley and the rope which is ordinarily a disadvantageous result of diametric construction of the usual wire rope especially where V grooved pulleys are used. The elastic core, however, enables the rope to conform somewhat to the surface against which it is tensioned. This action increases the coefficient of friction between the rope and the pulley and assists in preventing damage to either the rope or the pulley caused by bending stresses.

While for purposes of illustrating the invention, only two types of rope having an elastic core have been disclosed, it is to be understood that other types of wire construction to surround the core can be employed and various elastic materials can be used for the cable core by those skilled in the art without departing from the concept of the present invention.

I claim:

1. A wire rope comprising a plurality of metal strands surrounding a core of elastic material, each of said strands being composed of a plurality of wires twisted about a hemp core containing an absorbed lubricant.

2. A wire rope comprising a plurality of metal strands surrounding a core of elastic material, each of said strands being composed of a plurality of wires twisted about a hemp core containing an absorbed tallow.

3. A wire rope comprising a plurality of metal strands surrounding a rubber core, each of said strands being composed of a plurality of wires twisted about a hemp core containing an absorbed lubricant.

4. A wire rope comprising a plurality of metal strands surrounding a solid rubber core, each of said strands being composed of a plurality of wires twisted about a hemp core containing an absorbed lubricant.

5. A wire rope comprising a plurality of metal strands surrounding a hollow rubber core, each of said strands being composed of a plurality of wires twisted about a hemp core containing an absorbed lubricant.

6. A wire rope comprising a plurality of metal strands surrounding a synthetic oil-resistant rubber core, each of said strands being composed of a plurality of wires twisted about a hemp core containing an absorbed lubricant.

7. A wire rope comprising a plurality of metal strands surrounding a core of chloroprene rubber, each of said strands being composed of a plurality of wires twisted about a hemp core containing an absorbed lubricant.

8. A wire rope comprising a plurality of metal strands surrounding a rubber core, each of said strands being composed of a plurality of wires twisted about a hemp core containing an absorbed tallow.

9. A wire rope comprising a plurality of metal strands surrounding a synthetic rubber core, each of said strands being composed of a plurality of wires twisted about a hemp core containing an absorbed tallow.

ANDREW TRAVERS EWELL.

REFERENCES CITED

The following references are of record in the file of this patent:

UNITED STATES PATENTS

| Number | Name | Date |
|---|---|---|
| 1,769,945 | Erkert | July 8, 1930 |
| 2,000,952 | Hodson | May 14, 1935 |
| 2,074,956 | Carstarphen | Mar. 23, 1937 |
| 2,136,866 | Reed | Nov. 15, 1938 |
| 2,147,118 | Ellsworth et al. | Feb. 14, 1939 |